United States Patent [19]

Dudzik

[11] Patent Number: 4,640,493
[45] Date of Patent: Feb. 3, 1987

[54] TAP FOR A LIQUID CONTAINER
[75] Inventor: Henryk Dudzik, Mansfield, United Kingdom
[73] Assignee: Mardon Illingworth, Ltd., England
[21] Appl. No.: 747,978
[22] Filed: Jun. 24, 1985
[51] Int. Cl.⁴ .............................................. B67D 3/00
[52] U.S. Cl. .................................. 251/342; 222/153; 222/509; 267/158
[58] Field of Search ................ 251/342; 222/153, 509; 267/158, 159

[56] References Cited

U.S. PATENT DOCUMENTS

| | | | |
|---|---|---|---|
| 3,323,690 | 6/1967 | Monahon | 222/509 X |
| 3,460,871 | 8/1969 | Keller et al. | 267/158 X |
| 3,582,594 | 6/1971 | Twyford | 267/159 X |
| 3,595,445 | 7/1971 | Buford et al. | 251/342 X |
| 4,033,487 | 7/1977 | Micallef | 222/509 X |
| 4,471,807 | 9/1984 | Lucking et al. | 137/614.18 X |
| 4,513,771 | 4/1985 | Thomas et al. | 137/315 |

FOREIGN PATENT DOCUMENTS 403943 10/1967 Australia .
977660 12/1964 United Kingdom .

Primary Examiner—A. Michael Chambers
Assistant Examiner—John C. Fox

[57] ABSTRACT

The tap is particularly intended for mounting in the neck of a plastics bag for support in a cardboard box. The tap has a hollow body (11) one end of which is open to the bag, the other end being closed by a resilient diaphragm (22). A valve stem (26) is integral with the diaphragm and carries a closure member (35), the diaphragm holding the member in sealing contact with the body to close the bag to the tap outlet (24). The diaphragm is also integral with elements (40, 41) which can be squeezed together to move the diaphragm to open the tap. Resilient means (43) is integrally formed between the elements (40, 41). A plate (50) prevents squeezing of the elements until it has been removed.

9 Claims, 4 Drawing Figures

TAP FOR A LIQUID CONTAINER

This invention relates to a tap for a liquid container and is especially useful for the type of container in which a liner of flexible plastics material is supported in a cardboard box. Such containers are used for holding wines and other alcoholic drinks.

One design of tap for this purpose incorporates a rotary valve in which an inner tube has a radial aperture which can be closed or opened by turning an outer member received on the tube and also having a radial aperture which can be aligned with the other aperture. This type of valve has a tendency to leak unless is it very well constructed, in which case the tap is expensive to produce.

Another design uses a valve having an axially movable disc, which is biased against a valve seat. A valve stem can be pushed to lift the disc off the seat. This design can be cheaply produced, but is not convenient to use, because of the necessity to maintain pressure on the stem, whilst the tap is open.

A valve of this type is disclosed in Australian Patent Specification No. 403943.

United Kingdom Patent Specification No. 977660 discloses a tap including a piston slidable in a hollow body, the piston having a valve head which is urged by pressure in a container against a valve seat in the body. In this design, a pivoted lever handle can be operated to actuate a valve stem to lift the valve head off the seat. The lever handle makes the valve easy to open against the container pressure, but the valve is expensive to produce with several moving parts which have to be assembled.

The present invention provides a tap, which is particularly effective, can be cheaply manufactured and is easy to use.

In accordance with this invention, there is provided a tap for a liquid container, the tap comprising a hollow body open at one end and closed at the opposite end by a flexible diaphragm, a valve seat within the body and a valve closure member supported by a valve stem movable by the diaphragm, the diaphragm serving to bias the member into engagement with the seat, the body having an outlet closable from communication with said one end by the valve closure member engaging the seat, and a pair of spaced, grippable elements hinged to the body and arranged to cause movement of the diaphragm as the gripping elements are squeezed towards each other.

Preferably the grippable elements are integrally formed with the body from plastics material, and have reduced thickness portions to define the hinges.

Also preferably, resilient means is provided between the grippable elements to hold the elements in positions in which the tap is closed. The resilient means, advantageously, includes a loop-shaped portion which is deformable as the elements are squeezed.

The loop-shaped portion preferably accommodates a member, secured thereto by fracturable means, to prevent the relative movement of the opposite walls of the loop, the member being removable. The member serves, therefore, to prevent movement of the elements and opening of the tap and removal of the member indicates that tampering has occurred.

It is also preferred that the valve stem is integrally formed with the diaphragm. The stem may have integral means for securing the valve closure member on the stem.

The valve seat may be frusto-conical to provide for tolerances in the relative sizes of the seat and the valve closure member and to provide for automatic adjustment of the seating position in use.

Reference is now made to the accompanying drawings, wherein.

Figure 1:
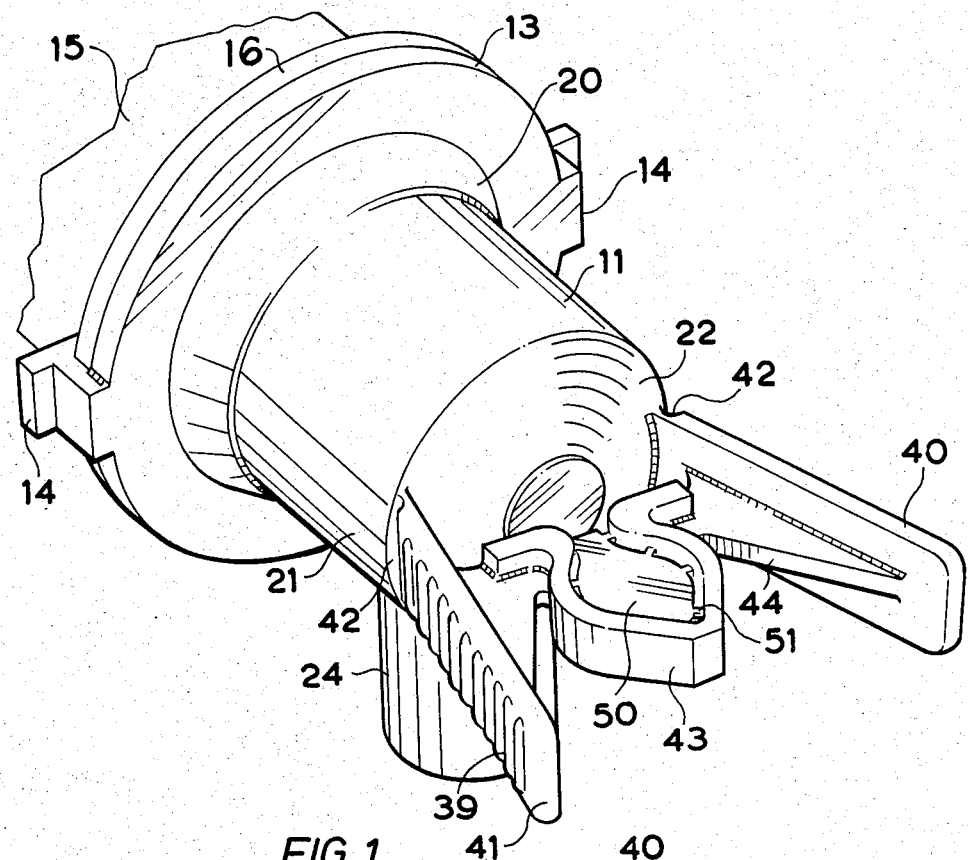
FIG. 1 is a perspective view of a tap according to the invention.
Figure 2:
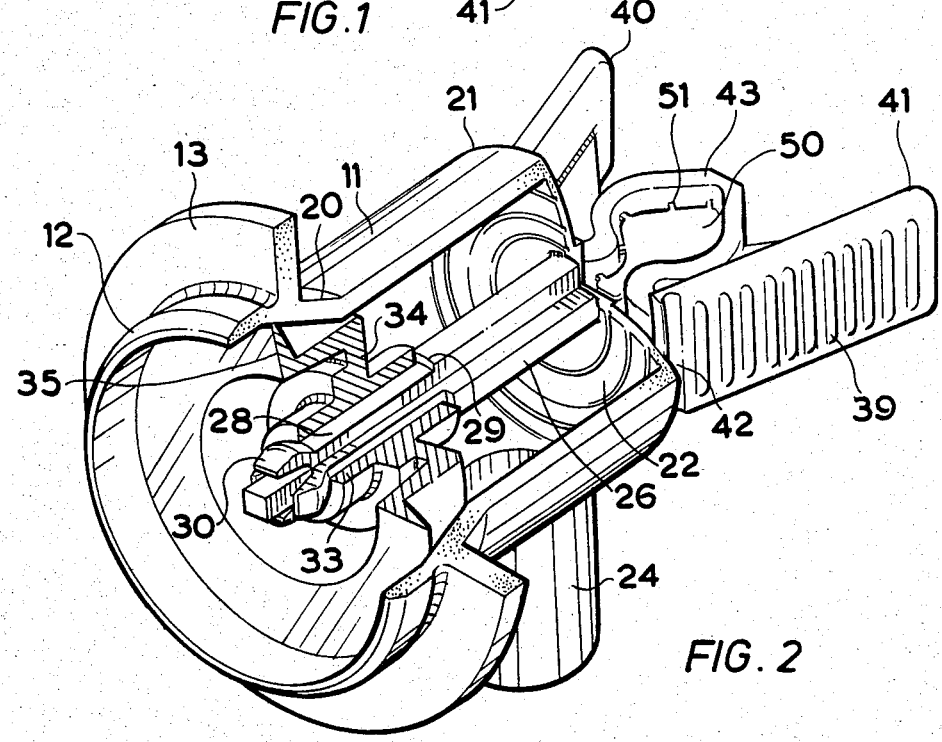
FIG. 2 is a perspective view, with parts broken away to show the interior of the tap.

The tap shown comprises a hollow tubular body 11 open at one end part 12. Adjacent this end is provided an outwardly projecting annular flange 13, which carries integral clips 14. In use, the flange 13 butts against a flange 16 of an outlet port 15 on a container and the clips 14 engage the flange 16, with the end part 12 sealingly engaging in the port.

The body 11 has a frusto-conical part 20 adjacent the flange 13 and converging to a main cylindrical part 21. The cylindrical part terminates in a resiliently flexible diaphragm 22. Between the frusto-conical part 20 and the diaphragm 22 is provided a radial outlet spout 24.

The diaphragm 22 carries a valve stem 26 of cruciform section, the stem extending axially centrally of the body to beyond the frusto-conical part 20. The stem has a reduced thickness portion 28 defining a shoulder 29 and a plurality of integral resilient lugs 30 adjacent the free end and spaced from the shoulder 29.

All of the parts of the tap, so described, are moulded in one-piece from plastics material. A separate moulding comprises a sleeve 33 integral with a flange 34 and an annular closure member 35, which is triangular in section. The sleeve fits snugly on the reduced thickness portion 28 and is urged against the shoulder 29 by the lugs 30. The resilience of the lugs permits them to be depressed to allow the sleeve to be snap-engaged over the lugs.

The periphery of the annular valve closure member 35 engages with the internal surface of the frusto-conical portion 20 of the body, this surface defining a valve seat. The resilience of the diaphragm 22, which is domed, pulls the member 35 into engagement with the seat. Any internal pressure in the container also acts to urge the member against the seat.

Integral with the exterior of the body 11 at the end adjacent the diaphragm is a pair of grippable levers 40, 41. The levers extend generally parallel to the body axis at diametrally opposite sides of the body. Each lever is jointed to the body by a relatively thin portion defining a hinge 42, permitting the levers to be squeezed towards each other. The levers have ridges 39 to assist gripping.

A loop-shaped portion 43 lies between the levers and each lever is joined to the base of the loop-shaped portion, adjacent the diaphragm, by a gusset 44. The loop-shaped portion has flexible walls.

The levers, the loop-shaped portion and the gussets are all integral parts of the plastics moulding including the body 11.

Also forming part of the moulding is a thin plate 50 which closes the loop-shaped portion 43. The edge of the plate is connected to the portion 43 by a multiplicity of thin, frangible parts 51. The plate 50 prevents the deformation of the loop-shaped portion 43 and, therefore, prevents operation of the tap, which is sealed in the closed condition. In order to use the tap, the plate 50 has to be pushed out of position, with breakage of the frangible parts 51. This plate, therefore, serves to indicate whether the tap has been tampered with.

Figure 3:
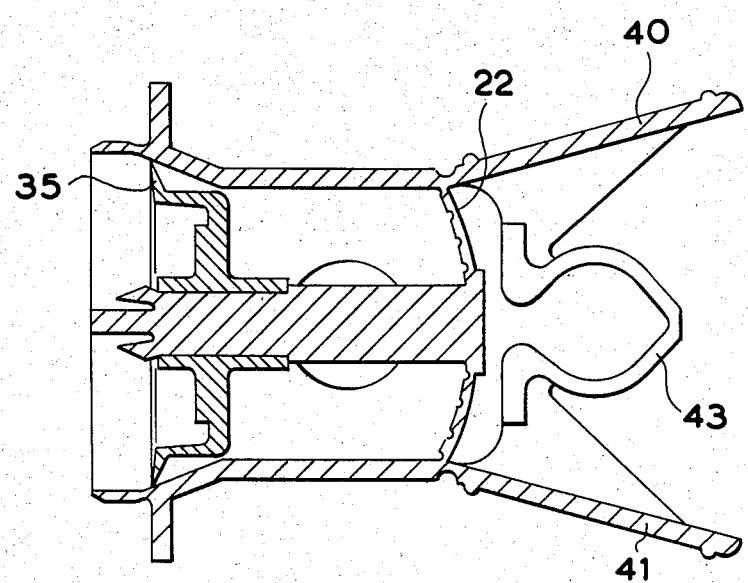
FIG. 3 is a sectional elevation of the tap.
Figure 4:
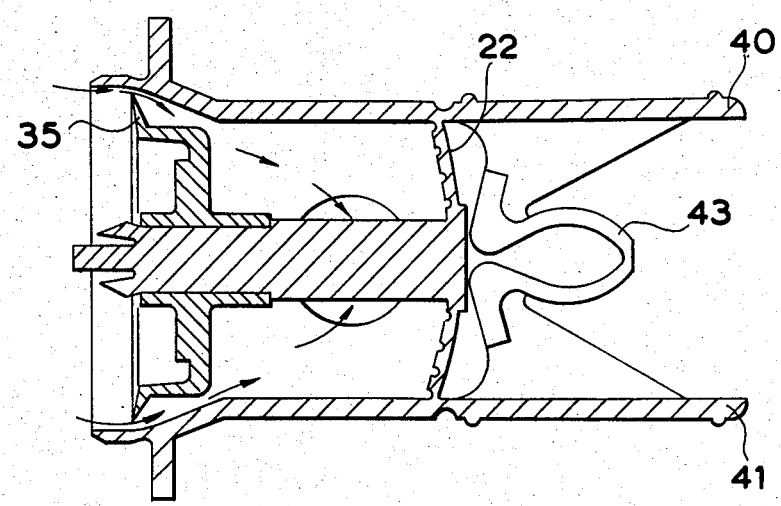
FIG. 4 is a view similar to FIG. 3, but shown in a position of use.

FIG. 3 shows the tap with the plate 50 removed and FIG. 4 shows the tap with the levers 40, 41 squeezed towards each other. It can be seen that movement of the levers causes depression of the diaphragm 22 to open the valve. At the same time, the loop-shaped portion 43 is deformed and acts as a spring to return the levers to the FIG. 3 position, on release. This spring effect also assist the diaphragm to return to the FIG. 3 position, in which the valve is closed. The loop-shaped portion 43 may be arranged to abut the diaphragm, when deformed, to assist opening of the valve.

I claim:

1. A tap for a container holding a substance, wherein said tap comprises:
    hollow body means having an open mouth defined at an end thereof;
    flexible diaphragm means closing an end of said hollow body means opposite to said open mouth;
    outlet port means for providing an exit way from said tap for said substance;
    valve closure means in operative engagement with said diaphragm means for opening and closing a passageway between said open mouth and said outlet port means;
    spaced grippable element means including a pair of grippable levers hinged to said hollow body means said grippable levers extending generally parallel to the axis of said hollow body means;
    resilient means interposed between and biasing said grippable levers in a manner whereby said tap is maintained in a closed position whereupon the actuation of said grippable levers against said baising by said resilient means thereby causes said resilient means to act on said diaphragm means which in turn acts upon said valve closure means to open said tap.

2. A tap according to claim 1, wherein said valve closure means further comprises valve seat means, valve closure member means cooperable with said valve seat means, and valve stem means between said valve closure member means and said diaphragm means, whereby said valve stem means is movable by said diaphragm means for removing said valve closure member means from said valve seat means thereby opening said passageway.

3. A tap according to claim 2, wherein said valve seat means is frustoconical.

4. A tap according to claim 1, wherein said grippable element means, said resilient means and said diaphragm means are integrally formed with said hollow body means in a single plastics molding.

5. A tap according to claim 4, wherein said grippable element means further comprise portions of reduced thickness, defining hinges for hinging said grippable element means to said hollow body means.

6. A tap according to claim 4, wherein said valve closure means further includes valve stem means which is integrally formed with said diaphragm means, wherein said grippable element means, said resilient means and said diaphragm means are integrally formed with said hollow body means in a single plastics molding.

7. A tap according to claim 4, wherein said resilient means includes a loop-shaped portion and gussets between said looped shaped portion and said grippable element means, said loop-shaped portion being deformable as said grippable element means are squeezed towards each other.

8. A tap for a container holding a substance, wherein said tap comprises:
    hollow body means having an open mouth defined at an end thereof;
    flexible diaphragm means closing an end of said hollow body means opposite to said open mouth;
    outlet port means for providing an exitway from said tap for said substance;
    valve closure means in operative engagement with said diaphragm means for opening and closing a passageway between said open mouth and said outlet port means;
    spaced grippable element means hinged to said hollow body means;
    resilient means interposed between and biasing said spaced grippable element means in a manner whereby said tap is maintained in a closed position, whereupon the acutation of said spaced grippable element means against said biasing by said resilient means thereby causes said resilient means to act on said diaphragm means which in turn acts upon said valve closure means to open said tap, wherein said grippable element means, said resilient means and said diaphragm means are integrally formed with said hollow body means in a single plastics molding and said resilient means includes a loop-shaped portion and gussets between said looped shaped portion and said grippable element means, said loop-shaped portion being deformable as said grippable element means are squeezed towards each other; and
    plate means accommodated in said loop-shaped portion and secured thereto by frangible means, said plate means preventing said grippable element means from being squeezed towards each other to open the tap, said plate means being removable by fracturing said frangible means.

9. A tap for a liquid container, the tap comprising a hollow body, a flexible diaphragm closing a first end of the body, an open mouth defined at the opposite second end of the body, an outlet port defined in a wall of the body between said ends, a pair of spaced grippable elements hinged to the body at said first end, the grippable elements being squeezable towards each other to move the diaphragm towards said second end, a valve seat within the body, a valve closure member co-operable with the valve seat, and a valve stem between the valve closure member and the diaphragm, the valve stem being movable by the diaphragm to lift the valve closure member off the valve seat, when the grippable elements are squeezed towards each other, so as to open the tap, the resilient means including a loop-shaped portion which is deformable as the grippable elements are squeezed towards each other and a member accommodated in the loop and secured thereto by frangible means, said member preventing the grippable elements being squeezed towards each other to open the tap, said member being removable by fracturing said frangible means.

* * * * *